Figure 5:
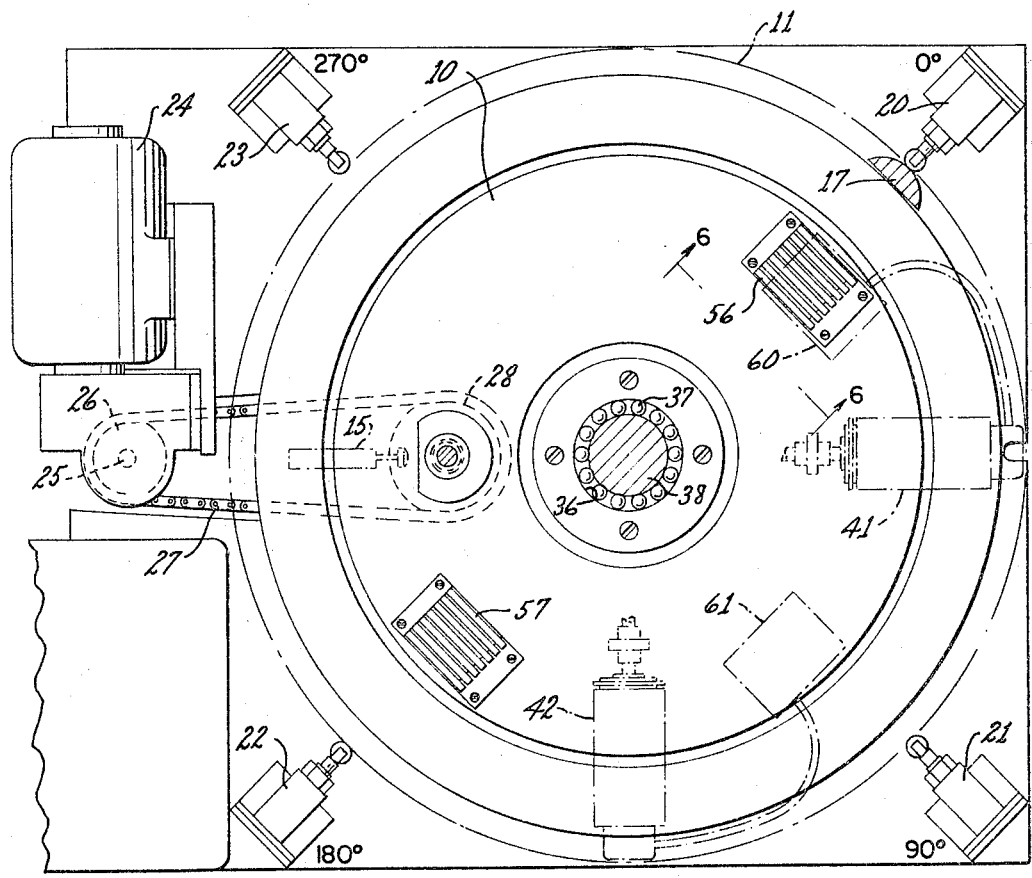

Sept. 6, 1966   K. E. BIRRELL ETAL   3,270,423
POSITIONING DEVICE

Filed Sept. 30, 1963   5 Sheets-Sheet 1

INVENTORS
KIRK E. BIRRELL
ROBERT E. ESCH
JAMES M. STEMPLE
BY
ATTORNEY

INVENTORS
KIRK E. BIRRELL
ROBERT E. ESCH
JAMES M. STEMPLE

BY

ATTORNEY

INVENTORS
KIRK E. BIRRELL
ROBERT E. ESCH
JAMES M. STEMPLE

BY
ATTORNEY

Sept. 6, 1966     K. E. BIRRELL ETAL     3,270,423
POSITIONING DEVICE

Filed Sept. 30, 1963     5 Sheets-Sheet 4

INVENTORS
KIRK E. BIRRELL
ROBERT E. ESCH
JAMES M. STEMPLE
BY Ernest D. Hix
ATTORNEY Sept. 6, 1966   K. E. BIRRELL ETAL   3,270,423
POSITIONING DEVICE Filed Sept. 30, 1963   5 Sheets-Sheet 5

INVENTORS
KIRK E. BIRRELL
ROBERT E. ESCH
BY  JAMES M. STEMPLE

ATTORNEY

United States Patent Office 3,270,423
Patented Sept. 6, 1966

3,270,423
POSITIONING DEVICE
Kirk E. Birrell, Bellbrook, Robert E. Esch, Kettering, and James M. Stemple, Springfield, Ohio, assignors to The Sheffield Corporation, Dayton, Ohio, a corporation of Delaware
Filed Sept. 30, 1963, Ser. No. 312,623
14 Claims. (Cl. 33—174)

This invention relates to positioning devices and more specifically to a device for rotatably supporting a workpiece and locating said workpiece at a desired relation relative to its reference axis of rotation.

During the manufacture and inspection of workpieces it is desirable to eliminate operator error and improve operating efficiency. In many cases in which a workpiece is rotatably carried it is necessary in either machining or measuring to accurately position the workpiece with respect to the axis about which it rotates. This procedure ordinarily involves great amounts of time by skilled operators and the use of complicated and expensive fixtures. As one example, in precisely measuring a cylindrical workpiece by rotating it while in association with a gaging device, by preliminarily making the axis of the workpiece and axis of workpiece rotation coincide, it is obvious that the gaging device will then indicate the configuration of the workpiece alone rather than provide an indication which includes errors or distortions caused by displacement of the workpiece from the axis of gaging rotation. Especially in machining operations requiring high accuracy of the finished form and in precision gaging applications, the positioning or locating of a workpiece on the worktable by moving the workpiece thereon is difficult or impossible manually, even when done by skilled operators, with sufficient accuracy to enable the performance of a subsequent machining or gaging operation. Prior known devices generally employed in industry for rotatably supporting a workpiece shift both the workpiece and the reference axis or axis of rotation and have no provision for moving and precisely positioning a workpiece relative to said axis.

It is an object of this invention to provide a positioning device for supporting a workpiece for rotation about a reference axis of rotation in, for example, gaging or machining operations, and for precisely and rapidly positioning said workpiece at a desired relation relative to the axis of rotation about which it is rotatably supported.

Another object of this invention is to provide such a device having unique features in its workpiece supporting, rotating, and positioning structure, providing extreme accuracy in both rotation about the reference axis and in positioning the workpiece relative thereto, in a device which is rugged and compact for rigidity and precision through a long service life.

Another object of this invention is to provide a positioning device of the character referred to above, having automatic workpiece position control means responsive both to gaging means controlled by the workpiece position relative to the reference axis, and to the rotational positions of the workpiece about said axis, for comparing stored and active gaging signals obtained at opposed gaging positions between which the workpiece supporting table is indexed, and positioning the supporting table along the axis of gaging at the indexed positions in accordance with the comparison obtained.

Figure 6:
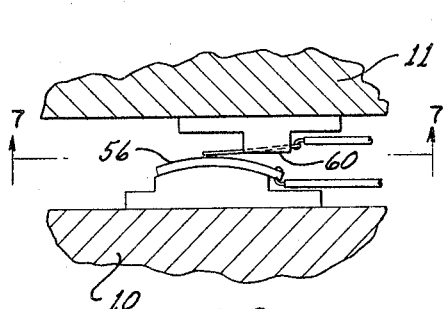
Figure 7:
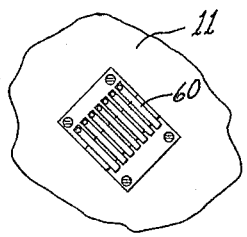
Figure 8:
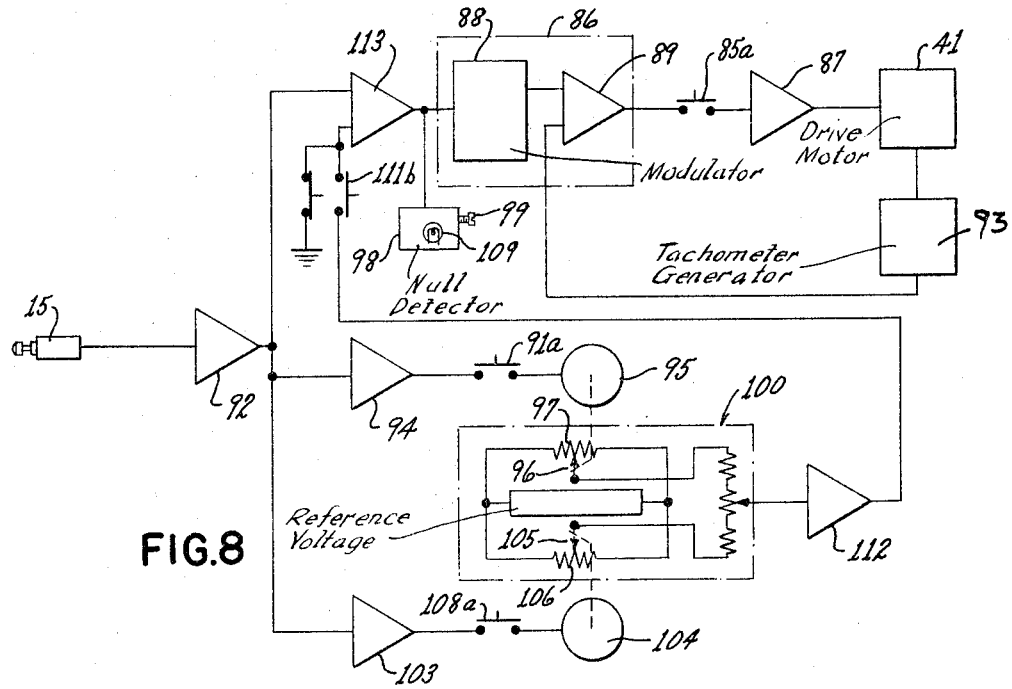
Figure 9:
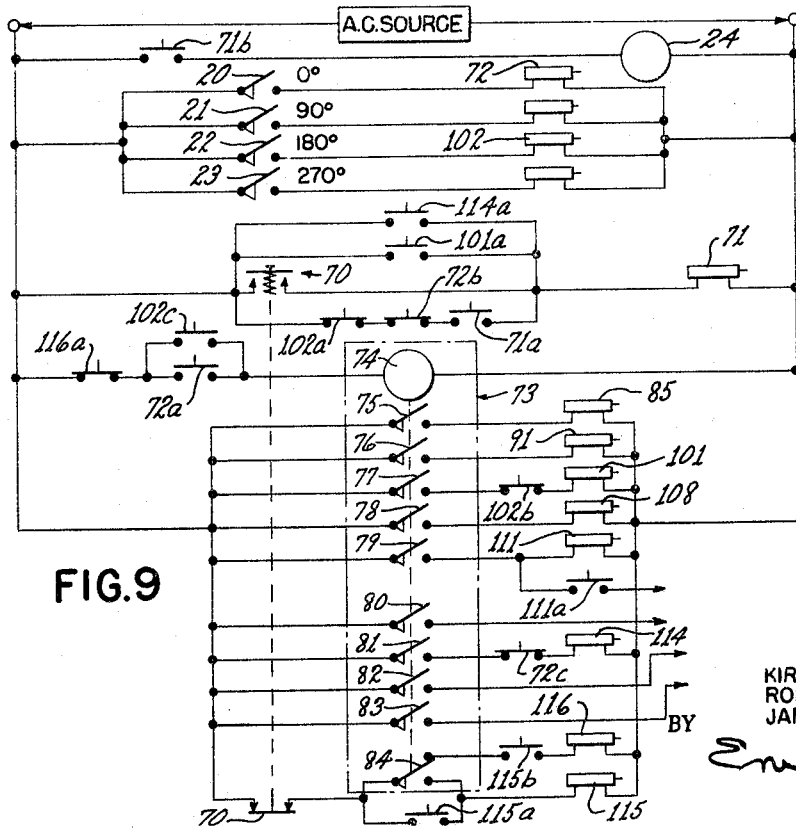
Figure 10:
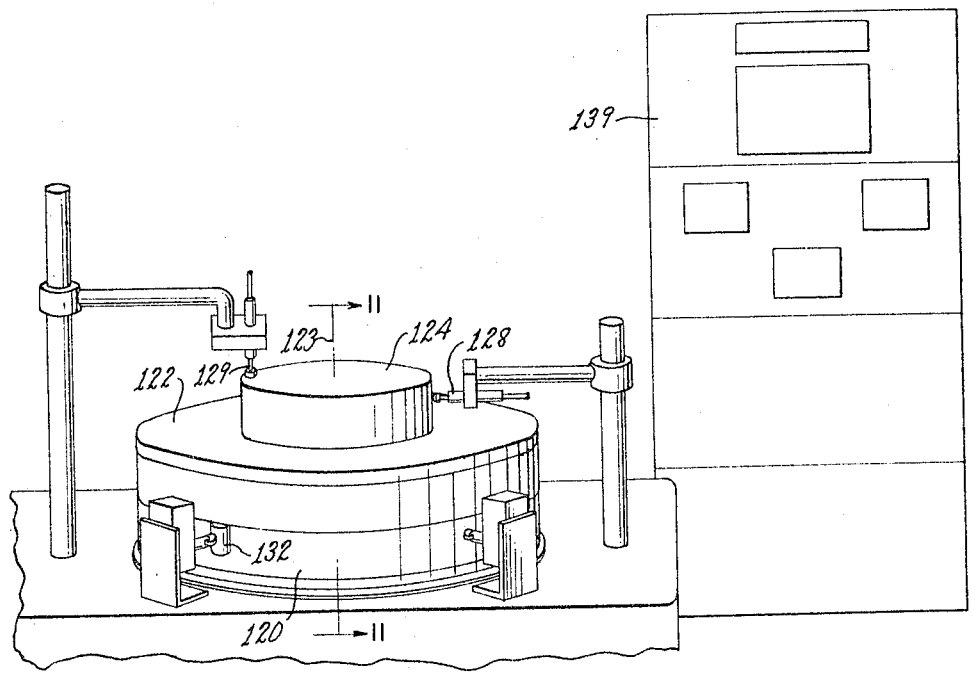
Figure 11:
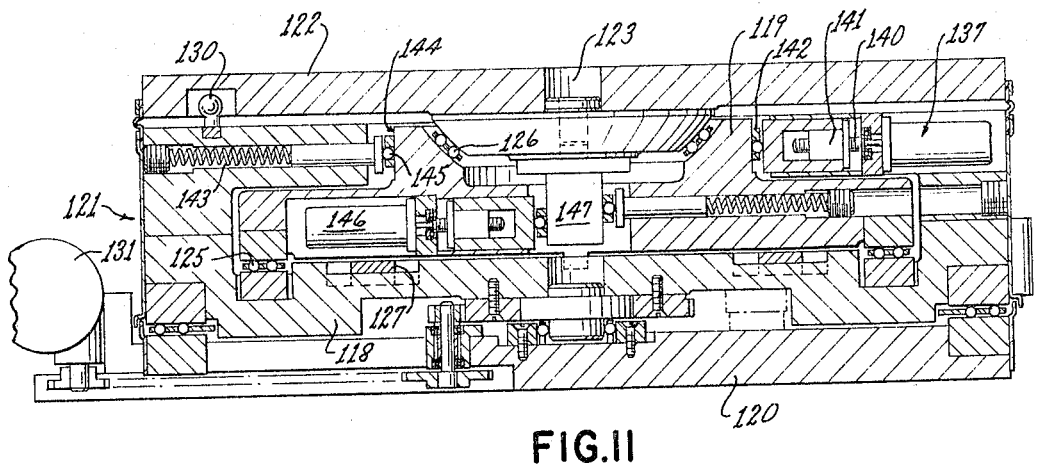
Figures 12, 13, 14, 15:
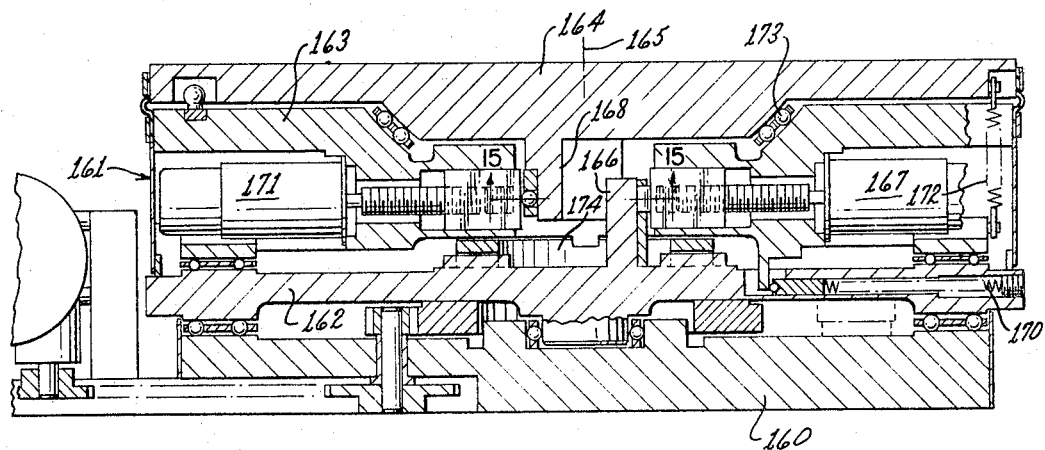

Other objects and advantages of the invention will be apparent from the following description, the appended claims, and the accompanying drawings, in which, FIG. 1 is a perspective view showing an exemplary application of one embodiment of the present invention,
FIG. 2 is a sectional view on the line 2—2, of FIG. 1,
FIG. 3 is a sectional view on the line 3—3, of FIG. 2,
FIG. 4 is a perspective view showing in enlarged detail the means for coupling the worktable to the carrying means in the embodiment of FIG. 1,
FIG. 5 is a view on the line 5—5 of FIG. 2,
FIG. 6 is a view on the line 6—6 of FIG. 5,
FIG. 7 is a view on the line 7—7 of FIG. 6,
FIGS. 8 and 9 illustrate the electrical system for the embodiment of the invention illustrated in FIG. 1, including its automatic control features.
FIG. 10 is a perspective view showing an exemplary application of a second embodiment of the present invention.
FIG. 11 is a cross sectional view on the line 11—11 of FIG. 10,
FIG. 12 is a view showing the positioning of switches used to stop the worktable at each ninety degree index position in the embodiment of FIG. 10,
FIG. 13 is a view in cross section showing an exemplary application of a further embodiment of the present invention,
FIG. 14 is a perspective view of the coupling means of the embodiment of FIG. 13, and
FIG. 15 is a sectional view on the line 15—15 of FIG. 13.

In the embodiment of the invention illustrated in FIGS. 1–7 the device includes a base 10 and a carrying means, including a rotatable support 11, which carries a worktable 12 for rotation with the support on the base.

Referring particularly to FIG. 1, a workpiece 13 to be precisely positioned relative to the axis of rotation through application of the present invention is initially roughly positioned and fastened on the worktable 12.

The position of the workpiece with respect to a fixed reference axis of rotation 14 of support 11 is indicated by suitable signal means such as a gaging element or cartridge 15 carried with base 10 by a common support. An electrical gaging element of the type used in the illustrated example is disclosed in Patent No. 2,833,046.

A console 19 is provided for housing electrical components and includes the automatic control system for the device.

Drive means mounted on the base and operatively connected to the rotatable support 11 rotate the support and the worktable 12 and causes a cam 17 fixed to the support to sequentially engage cooperating rotation responsive means such as switches 20, 21, 22, and 23 mounted on the base at predetermined angularly displaced positions to indicate the rotational position of the worktable 12 and hence of the workpiece 13 carried thereon as each switch is engaged by cam 17. In the illustrated embodiment the switches are mounted in a horizontal plane and angularly displaced ninety degrees from each other.

The drive means for rotating the support and worktable about axis of rotation 14 is particularly illustrated in FIGS. 2 and 5 and comprises an electric motor 24 mounted on the base and having a shaft 25 extending therefrom to which is attached a sprocket 26. Sprocket 26 engages a noiseless chain 27 which drives, through sprocket 28 and gear assembly 31, a large gear 30 fixed to support 11. Motor 24 is energized and deenergized by switches 20 through 23 through automatic control system to rotate and stop table 12 in an automatic and sequential manner.

Load carrying bearing means between the base 10 and the support 11 are precision antifriction ball bearings 32 vertically between precision lapped surfaces and held in position in accurately spaced holes in a disc shaped member 34 which is constructed of a hard fibrous material. The number and arrangement of ball bearings 32 assures adequate bearing support while permitting free rotational movements of the support and worktable.

To radially locate support 11 on base 10 and determine axis of rotation 14, precision ball bearings 37 positioned in cylindrical cage 35 cooperate between post 28 on support 11 and cylindrical portion 36 on the base. The diameters of bearings 37 and the surfaces between which they cooperate are very precisely formed and held to assure virtually no radial movement.

The support 11 carries the worktable 12 and is coupled therewith for simultaneous rotation by coupling means illustrated in perspective as a slide assembly 40 in FIG. 4. Slide assembly 40 permits rectilinear adjustment in two mutually perpendicular directions.

Actuating means such as actuating drive motors 41 and 42 illustrated in FIG. 3 are provided for adjusting the worktable relative to support 11. Motor 41 is fastened to the support 11 and rotates a threaded shaft 43 which engages a cooperating nut 44 which is held against rotation and guided for sliding rectilinear movement. As shaft 43 rotates, the nut 44 slides forward and applies a force substantially radially to the axis of rotation to post 45 of worktable 12 through a bearing unit 48 which allows relative movement of post 45 transverse to the direction of force application thereby moving the worktable rectilinearly in one direction against a compression spring 46 fastened to support 11. Spring 46 engages the worktable at 47 through a similarly functioning bearing unit 49. Bearing units 48 and 49 assure free movement of worktable 12 along a path transverse to movement caused by drive motor 41, and transverse movement of worktable 12 caused by drive motor 42 will be unobstructed. Energy for moving the table in the opposite direction as nut 44 retracts with opposite rotation of motor 41 is provided by the compressed spring 46. Spring 46 also assures that there is no backlash in the actuating system.

In an identical manner actuating motor 42 is fastened to support 11 and rotates another threaded shaft 50 which engages a cooperating nut 51 which is held and guided for sliding rectilinear movement as it engages the worktable at 52 through bearing unit 48. Another spring 53 engages the worktable at 54 through bearing unit 49, to enable operation in a manner as previously described in connection with motor 41 and spring 46. Actuating motors 41 and 42 lie in a common plane perpendicular to the axis of rotation for compactness and resulting rigidity and precision in operation.

Thus through selective energization of motors 41 and 42 worktable 12 is positioned relative to support 11 and axis of rotation 14 in mutually perpendicular directions.

Switches 20, 21, 22, and 23 are sequentially actuated by cam 17 as previously mentioned and as cam 17 engages a given switch, dynamic braking is applied to stop support 11 and coupled table 12 at the positions established by the actuated switch.

To simplify the electrical circuitry required and to assure that electrical energy is provided to motors 41 and 42 as required, two electrical contact sets 56 and 57 are fixed to the base 10 and spaced apart 180 degrees. Contact sets 56 and 57 are alternately engaged by one of two movable electrical contact sets 60 and 61 which are spaced apart ninety degrees and fixed to the support 11 for rotation therewith. The arrangement of the contacts, illustrated in FIG. 5, assures that only one fixed contact and one rotatable contact is brought into cooperating engagement as cam 17 engages each switch 20, 21, 22, or 23 to stop the support at the 0°, 90°, 180°, or 270° positions respectively, thereby assuring that electrical energy is provided to only one electrical actuating motor at a time and alternatively to the motors at sequential ninety degree stopping positions.

The initial placement of switches 20, 21, 22, and 23 to define the 0°, 90°, 180°, or 270° positions respectively, is arbitrary and fixed contacts 56 and 57 are fixed on the base 180° apart for example in line with the 0° and 180° positions.

As will be apparent from FIG. 5, as cam 17 engages switch 20 at the 0° position and switch 22 at the 180° position, stationary and rotatable contact sets to motor 41 are in engagement and the axis of motor 41 is in a plane radial to the axis of rotation and including gaging cartridge 15 to accomplish rectilinear movement of the worktable along the gaging axis.

Likewise as cam 17 engages switches 21 and 23 at the 90° and 270° positions respectively, contact sets are in engagement to motor 42 to accomplish rectilinear movement of the worktable along an axis 90° thereto also substantially coinciding with the gaging axis. Thus the indexed gaging and actuating positions are obtained with the cooperating components in the desired operational relationship.

The operation of the electrical system including it automatic control features will be described only with relation to the previously mentioned axis defined by the 0° and 180° positions. The electrical components necessary to enable centering about any other axis, such as the transverse axis in the illustrated embodiment would be identical.

The circuitry for automatic positioning through control of actuating motors 41 and 42 and drive motor 24 from signals provided by cartridge 15 and switches 20–23 will now be described.

To start the automatic cycle a switch 70 is manually closed to energize control relay 71 which closes contacts 71a and 71b.

Closing contacts 71a keeps relay 71 energized after switch 70 is released while closing contacts 71b completes a circuit to the table drive motor 24 and conventional power supply therefor to rotate the table until cam 17 engages switch 20 at the 0° position.

Swith 20 completes a circuit to a control relay 72 which closes contacts 72a and opens contacts 72b.

Opening contacts 72b deenergizes relay 71 allowing contacts 71b to open and stop the table drive motor 24 at said 0° position. The table stops practically instantaneously because the drive motor applies dynamic braking to the table in a conventional manner.

Closing contacts 72a completes a circuit to a conventional cam timer 73 having a motor 74 which actuates cam switches 75 through 84 individually in accordance with a predetermined sequence of actuation as well as a predetermined time interval for each switch, for example an equal time interval of 15 seconds for each switch. In the present illustration the switches are actuated consecutively.

Cam timer motor 74 closes cam switch 75 first to complete a circuit energizing a control relay 85. Relay 85 closes contacts 85a permitting the signal from gaging cartridge 15 to be applied through an amplifier 92, a tachometer mixer 86 and through a conventional servo amplifier 87 to motor 41. The tachometer mixer 86 (also having connections to tachometer generator 93) includes a D.C. to A.C. chopper or modulator 88 which converts the D.C. signal from the cartridge 15 to an A.C. signal which is amplified in differential amplifier 89. Motor 41 moves the worktable 12 and workpiece 13 mounted thereon until gaging cartridge 15 reaches its null position. This is normally accomplished well within the time established for each cam switch to remain closed.

Switch 76 closes next to energize a control relay 91 thereby closing contacts 91a also enabling the gaging signal from cartridge 15 to be amplified through amplifier 92 and supplied through servo amplifier 94 to a servo motor 95 for the 0° position. Motor 95 positions an infinitely adjustable wiper 96 along a slidewire potentiometer 97 which is included in a balancing network 100 to store the 0° position gaging signal after positioning for use later in the automatic cycle.

The balancing network disclosed is similar to the type used in a self-balancing potentiometric recorder. The cam timer continues through its automatic cycle opening switch 76 thereby deenergizing control relay 91 and assuring that the gaging signal from cartridge 15, as it engages workpiece 13 at the 0° position, remains mechanically stored on slidewire 97 when the workpiece rotates beyond that position.

The cam timer motor 74 of timer 73 continues to rotate closing cam switch 77 which energizes a control relay 101 to close contacts 101a which energize relay 71 thereby closing contacts 71b and start the table rotating away from the 0° position.

Similar circuitry is provided for and similar operations are performed at the 90° and 270° positions as for the 0° position first described and for the 180° position now to be described. For simplicity of disclosure and to avoid repetitious subject matter, details of circuitry and operations at the 90° and 270° positions have been omitted.

After leaving the 90° position and upon reaching the 180° position switch 22 is energized completing a circuit to a control relay 102.

Relay 102 opens contacts 102a and b and closes contacts 102c. Opening contacts 102a deenergizes control relay 71 to stop the table drive motor 24 as previously described; while opening contacts 102b assures that power is not supplied to a control relay 101. Closing contacts 102c completes a circuit to once again start cam timer motor 74 and continue it through its cycle and close cam switch 78 next.

Cam switch 78 completes a circuit to a control relay 108 which closes contacts 108a which permits the active signal from cartridge 15 (the active gaging signal being in each instance that signal which is used while the worktable is at the gaging position where the signal is obtained) to be amplified through amplifier 92 and supplied through servo amplifier 103 to a servo motor 104 for the 180° position which continuously positions a wiper 105 along a slidewire potentiometer 106 included in balancing network 100 in accordance with the active gaging signal.

The circuit in network 100 is balanced so that the 0° position stored signal is compared with the 180° position active signal so that the average of the active and stored signals is fed to amplifier 112.

Cam timer motor 74 continues through its cycle opens switch 78 and closing cam switch 79. Switch 79 energizes a control relay 111 which closes contacts 111a and b. Closing contacts 111a energizes control relay 85 to complete a circuit to motor 41 as previously described, while closing contacts 111b completes a circuit through amplifier 112, differential amplifier 113, and through tach mixer 86 to cause motor 41 to move the worktable and workpiece in accordance with the stored and active signals.

The described movement between the 0° and 180° positions is accomplished as the active signal from cartridge 15 at any indexed position is compared to the average of the stored and active signal fed from balancing network 100 to amplifier 112 at amplifier 113 causing motor 41 to drive the worktable 12 carrying workpiece 13 until the output amplifier 113 is approximately zero. This occurs when the signal from gaging cartridge 15 equals the averaged signal coming from amplifier 112 and represents approximately one-half of the difference between the stored signal and the initial active signal. Gaging cartridge 15 continuously monitors the workpiece and worktable position while it is moving in a linear manner, until the signal from cartridge 15 equals the averaged signal.

Thus it is seen that motor 41 will move worktable 12 one-half of the difference between the 0° and 180° position stored and active gaging signals.

Because, for full positioning, adjustments of worktable 12 are made in transverse directions (0°–180° axis and 90°–270° axis) and adjustment along each axis may disturb the centering obtained along the other, the cycle is repeated until the desired refinement in centering is obtained. For this reason after positioning a new signal for the 180° position is obtained and stored. This is accomplished as cam motor 74 continues to rotate opening switch 79 and closing switch 80 to complete a circuit to relay 108 which closes contacts 108a and enables the signal from gaging cartridge 15 to be fed through the 180° servo amplifier 103 to servo motor 104 thereby positioning wiper 105 along potentiometer 106 to store a new gaging signal thereon corresponding to the new location to which the workpiece 13 and worktable 12 have been moved at the 180° position.

As cam motor 74 continues to rotate switch 80 is opened and cam switch 81 energized next thereby energizing a control relay 114. Relay 114 closes contacts 114a to energize control relay 71 which starts drive motor 24 through circuitry as previously described.

Worktable 12 is stopped at the 270° position, the stored 90° and active 270° signals are compared and the worktable 12 is positioned along the 90°–270° axis by motor 42. Drive motor 24 rotates worktable 12 toward the 0° position until cam 17 closes switch 20 which energizes control relay 72. Relay 72 opens contacts 72b and c to stop the table drive motor 24, and closes contacts 72a to start cam motor 74 which closes cam switch 82.

Cam switch 82 energizes control relay 91 to close contacts 91a and cause the active signal from cartridge 15 indicating the new location of workpiece 13 relative to cartridge 15 at the 0° position to be fed to balancing network 100 as previously described. The new active signal is compared with the signal previously stored at the 180° position so that the average of the active and stored signals is fed to amplifier 112.

If greater accuracies in centering are desired, the signal from gaging cartridge 15 may at this point in the cycle be centered to a new reference position and the amplification of the system increased to thereby achieve the desired accuracy.

As cam motor 74 continues to rotate switch 82 is opened and 83 closed thereby energizing control relay 111 which in turn energizes relay 85 and as previously described cause motor 41 to move the table 12 and workpiece 13 in accordance with the signal from amplifier 112.

As cam motor 74 continues to rotate cam switch 84 completes a circuit to energize a control relay 115 which closes contacts 115a and b.

Closing contacts 115a completes a circuit to keep relay 115 energized after switch 84 completes its cycle, while contacts 115b are kept closed and provide a circuit to energize control relay 116 as switch 84 returns to its initial position.

Relay 116 opens contacts 116a to remove the source of power from cam timer 73.

The initial positioning at 0° and 180° positions and the refinement at a second 180° positioning to compensate for variations introduced at the 90° and 270° positions has been described. The same operations occur at the 90° and 270° positions. The cycles may be continued for a predetermined number of revolutions of worktable 12 depending upon the degree of refinement desired. Inasmuch as the circuitry for obtaining a repetition of the cycle described for a predetermined number of revolutions is conventional it has not been disclosed.

To summarize, at the 0° position the workpiece is positioned along the gaging axis until the workpiece surface being engaged is at a nominal radial displacement from the axis of rotation for a workpiece of nominal configuration and diameter. At 180° the worktable is positioned until the active signal from amplifier 92 (which varies as the workpiece is adjusted) and the signal from amplifier 112 are equal as compared by differential amplifier 113. The signal from amplifier 112 will be reflective of one-half the difference between the stored 0° signal and the initial active signal at 180°. As previously described, similar operations occur at the 90° and 270° positions. It is necessary to return to the 0° position and repeat the operation to compensate for any 0°–180° position error introduced by 90°–270° positioning if, for example, a workpiece which is not round is being positioned. Thus if at the first 270° indexed position or any subsequent indexed position two consecutive acceptable checks have been made without positioning adjustments being required the workpiece is properly located.

To indicate when the worktable 12 and workpiece 13 are positioned within an acceptable tolerance limit with respect to reference axis 14 a null detector 98 is provided which operates in cooperation with differential amplifier 113. The null detector has an adjustment screw 99 for setting the desired acceptable tolerance limit. In addition a signal light 109 is provided on the null detector to indicate when the workpiece 13 has been positioned within the acceptable tolerance limit to enable manual stopping of the cycle. Likewise circuitry could be provided in a conventional manner to automatically stop the table by use of signals from the null detector for both axes of adjustment. It is, of course, possible and completely within the scope of this invention to electrically interconnect the null detector for the 0° and 180° position with the null detector for the 90° and 270° transverse axis and when the null detectors reach a predetermined relationship with no adjustment required at two consecutive indexed positions, conventional electrical circuitry is used to shut off the power supply to the rotary table and stop the centering cycle.

In order to start the automatic cycle again it is necessary to momentarily energize switch 70 thereby deenergizing relay 115 and setting up the circuit for the automatic sequence.

The sequencing of this unit has been achieved by using a cam timer and establishing the time sequence for each operation. It is, of course, completely within the scope of this invention to use null detectors in cooperation with the servo amplifiers to advance the positioning or centering sequence as null is reached.

In the embodiment of the invention illustrated in FIGS. 10 through 12, provision is made for both transverse and inclining modes of positioning through shifting of a workpiece transverse the axis of rotation and inclining or pivoting of the workpiece relative thereto in order that desired positioning of the workpiece relative to the axis can be fully obtained. The device of this embodiment includes a base 120 and a carrying means 121 which supports worktable 122 for rotation as well as both transverse and inclining positioning relative to the axis of rotation 123. Carrying means 121 includes support 118 rotatably mounted on base 120 through bearing structure substantially identical to that of the embodiment of FIGS. 1–7.

A carrier 119, providing supporting means for worktable 122, is carried on support 118 for transverse movement relative to the axis of rotation through bearings 125, and in turn supports worktable 122 for pivoting movement relative to the carrier and said axis through part spherical bearing assembly 126. Carrier 119 is rotatably driven with support 118 through a coupling key assembly 127 which accommodates transverse movement. Worktable 122 is driven from support 118 independent of its supporting structure through coupling means 130, one of which appears in FIG. 11, which drives while accommodating both transverse and pivoting or inclining movement of the worktable relative to the rotatable support. Support 118 is rotatably driven from motor 131 through a sprocket, chain, and gear arrangement, and its indexed positions are signaled by a cooperating cam 132 and spaced switches 133–136 respectively at the 0°, 90°, 180°, and 270° positions (see FIG. 12)—all similar in structure and function to corresponding components in the embodiment of FIGS. 1–7.

A workpiece 124 to be precisely positioned relative to the axis of rotation 123 is initially roughly positioned and fastened on the worktable within a predetermined area. Signal means are provided for engaging workpiece 124 and for signalling the movement thereof with respect to predetermined reference positions. A gaging cartridge 128 of the type previously referred to is provided for signalling horizontal displacement transverse to said reference axis 123 and a similar gaging cartridge 129 is provided for signalling vertical movement of the workpiece caused by inclining movements of the worktable 122 relative to said axis 123. Gaging cartridges 128, and 129 engage and signal the position of the workpiece at each angularly displaced position.

As previously described carrying means 121 carries worktable 122 thereon for rotating movement as it is driven by drive motor 131. Actuating means are provided for adjusting and inclining said worktable 122 with respect to said axis of rotation 123. First actuating means for transverse adjustment includes a pair of actuating drive motors, one of which is indicated at 137 in FIG. 11, lying in a common plane perpendicular to the axis of rotation 123 and arranged to apply forces in a horizontal plane and along paths at 90° to each other. The following description is directed to the actuating structure associated with motor 137 in FIG. 11, it being understood that similar structure is associated with the second actuating motor of this pair which is not illustrated. Actuator 137 is fastened to the support 118 and rotates a threaded shaft 140 which is effective through nut 141 and bearing means 142, as in the embodiment of FIGS. 1–7, to apply forces substantially radially to the axis of rotation to carrier 119. Thus worktable 122 is moved rectilinearly in that direction against an opposing compression spring 143 fastened to support 118 and engaging carrier 119 at 144 through a similarly functioning bearing means 145. Bearing means 142 and 145 assure free movement of carrier 119 and worktable 122 along a path transverse to movement caused by drive motor 137. Energy for moving carrier 119 in the opposite direction is provided by the compression spring as nut 141 retracts with opposite rotation of motor 137. Spring 143 also assures that there is no backlash in the actuating system.

As discussed above, a second actuating motor of this pair operates in a similar manner to achieve motion in the same plane and in a transverse direction.

The inclining means includes a pair of actuating drive motors, one of which is illustrated at 146 in FIG. 11, fastened on carrier 119 and also lying in a common plane parallel to the plane of the transverse drive motors. The inclining drive motors are supported on carrier 119 for operation along paths as 90 degrees to each other against a projection or post 147 on worktable 122 extending downward centrally below part spherical bearing 126. Each of the inclining actuating motors operates for tilting movement of worktable 122 by movement of post 147 in one direction, while allowing transverse movement of post 147 by the other actuating motor of the pair, through actuating structure similar to that involved in the transverse mode of adjustment of the worktable.

To achieve inclining motion in a 90° transverse direction the other actuating motor of the inclining pair operates in a manner as previously described for illustrated motor 146.

An electrical console 139 is provided for housing electrical components including control system components which provide for automatic centering and leveling of the worktable and hence of the workpiece carried thereby.

The electrical system for the embodiment illustrated in FIGS. 10 through 12 operates in an identical manner as that illustrated in FIGS. 8 and 9 for the embodiment of FIGS. 1–7. Consequently, the electrical system will not be described in detail. It will be readily apparent that the electrical system previously described can be applied to the transverse adjusting means operating in conjunction with signals from cartridge 128 as well as operation of the inclining means operating in conjunction with signals from cartridge 129, also operating in conjunction with the position responsive switches 133–136 of this embodiment.

In the embodiment of the invention illustrated in FIGS. 13 through 15, provision is made as in the embodiment of FIGS. 10–12, for transverse and inclining modes of positioning movements. The worktable supporting structure and load carrying bearings between the base, rotatable support, carrier and worktable arrangements are substantially identical to and operate in a similar manner as the structure of the embodiment of FIGS. 10–12. In this embodiment the base 160 supports carrying means 161 which includes a support 162 rotatably mounted on the base and a carrier 163 mounted for transverse movement on support 162 which in turn supports worktable 164 for inclining movements on the carrier.

Likewise the means for coupling the support 162, carrier 163 and worktable 164 for simultaneous rotation are basically identical to that of the next previous embodiment. A key 174 for coupling the support to the carrier is illustrated in FIG. 14. FIG. 13 illustrates the key arrangement for coupling the carrier 163 to the worktable 164. The drive and positioning signaling structure for support 162, as well as the arrangement of gaging cartridges for detecting worpiece position are also similar to corresponding structure in the next previous embodiment.

The support 162 rotates about fixed axis of rotation 165 and has an upwardly extending projection 166 against which a pair of actuating motors disposed relatively at 90° react to adjust the carrier 163 in a transverse mode with respect to axis of rotation 165. In this embodiment each adjusting motor is fastened rigidly to carrier 163 and moves the carrier relative to support 162 by applying a force against projection 166. Only one of the transverse adjusting motors is illustrated at 167 in FIG. 13. The other motor of the pair lies in the same plane and also provides transverse movement by applying a force against projection 166.

Compression springs are provided, one acting in opposition to each transverse adjusting motor. In the illustrated application spring 170 is shown parallel to the plane of the adjusting motors, to eliminate backlash in the transverse adjusting system and to provide energy to move carrier 163 during retraction of the transverse adjusting motors. Thus transverse movement of carrier 163 on support 162 is obtained with corresponding movement of worktable 164.

The worktable has a downwardly extending projection or extension 168 extending centrally below its part spherical bearing support 173 which is arranged with clearance with respect to upwardly extending projection 166 as illustrated in FIG. 15 to allow relative inclining movement therebetween in transverse directions. For inclining actuation a pair of actuating drive motors fastened to carrier 163 react against arm 168 to incline and tilt the worktable 164 with respect to the reference axis of rotation 165. Only one of the pair of actuating motors provided for inclining movements of the worktable is illustrated in FIG. 13 at 171. For inclining actuation during motor retraction and to eliminate lost motion or play in the actuating system, in the illustrated embodiment a tension spring is provided between the carrier and worktable for each inclining actuating motor. One of such springs is indicated at 172 in FIG. 13. The inclining motors and tensions spring provide for tilting actuation of worktable 164 in part spherical bearing 173.

As will be apparent from FIG. 13 actuating motors 171 and 167 lie in a common plane perpendicular to the reference axis of rotation 165, as do the other motors of the respective pairs provided for transverse adjustment and inclining modes of operation.

This arrangement of actuating components including the actuating motors in a common horizontal plane in the embodiment of FIGS. 13–15 achieves the ultimate in compactness and rigidity with resultant precision in movement and efficiency of operation. Automatic positioning for this embodiment through energiaztion of the actuating motors and support rotation motor is by means of the circuitry of FIGS. 8 and 9.

It will be appreciated that in the present invention precision in both rotation and workpiece positioning relative to the axis of rotation is essential.

In each embodiment of this invention the device is horizontally extended and vertically compact while supporting the workpiece centrally of the supporting bearings which are themselves of wide radius and vertically adjacent. This provides the ultimate in rigidity for the necessary precision rotation and positioning. Unique features of the present invention making possible economy of manufacture and providing compactness and rigidity for precision operation include the disposition of the actuating means in common radial planes as well as the full independence of rotational drive, table supporting, and table actuating structure. Also in each embodiment the supporting structure extends vertically between support and worktable about actuating mechanisms situated centrally therewithin thus in a sense intermeshing vertically for compactness. Through the unique positioning cycle provided by the controlling circuitry of this invention precision positioning is made possible in both transverse and inclining modes. Sequential indexing and adjustments through automatic comparison of stored and active gaging signals at the indexed positions insures precision positioning by sequential refining of location rapidly and efficiently.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. A device for supporting a workpiece for rotation about an axis of rotation and for positioning said workpiece to position a central axis of the workpiece to coincide with said axis of rotation comprising,
   a base,
   a support,
   bearing means cooperating between said support and said base mounting said support on said base for rotation about said axis of rotation,
   drive means operatively connected to said support for rotation thereof on said base and about said axis of rotation,
   a worktable carried by said support,
   supporting means cooperating between said support and said worktable carrying said worktable on said support for adjustment of said worktable and a workpiece mounted thereon transverse said axis of rotation and for pivoting movement relative thereto,
   coupling means interconnecting said support and said worktable for simultaneous rotation thereof,
   gaging means providing a gaging signal responsive to the position of the workpiece with respect to said axis of rotation,
   first actuating means carried by said support operatively connected to said worktable and controlled by said gaging signal for adjusting the worktable and a workpiece carried thereby in a plurality of angularly related directions transverse to said axis of rotation,
   second actuating means carried by said support operatively connected to said worktable and controlled by said gaging signal for inclining the worktable and a workpiece carried thereby relative to said support and said axis of rotation, each of said actuating means including a pair of drive motors relatively spaced at ninety degrees about said axis of rotation and lying in a common plane perpendicular thereto,
   and force transmitting means cooperating between each respective motor and said worktable for applying positioning forces to said worktable substantially radially to said axis of rotation while allowing relative movement transverse the direction of force application.

2. A device for supporting a workpiece for rotation about an axis of rotation and for positioning said workpiece at a desired relation relative to said axis of rotation comprising, a base,
a support,
bearing means cooperating between said support and said base mounting said support on said base for rotation about an axis of rotation,
a carrier,
bearing means cooperating between said support and said carrier mounting said carrier for movement on said support transverse said axis, actuating means lying in a common plane perpendicular to said axis cooperating between said support and said carrier for movement of said carrier transverse said axis,
a worktable,
bearing means cooperating between said carrier and said worktable mounting said worktable for pivoting movements on said carrier and relative to said axis,
actuating means lying in a common plane perpendicular to said axis cooperating between said carrier and said worktable for pivoting movement of said worktable,
and drive means operatively connected to said support for rotation of said worktable about said axis including drive connections from said support to both said carrier and said worktable.

3. A device for supporting a workpiece for rotation about an axis of rotation and for positioning said workpiece at a desired relation relative to said axis of rotation comprising, a base,
a support,
bearing means cooperating between said support and said base mounting said support on said base for rotation about an axis of rotation,
a carrier,
bearing means cooperating between said support and said carrier mounting said carrier for movement on said support transverse said axis,
actuating means lying in a common plane perpendicular to said axis cooperating between said support and said carrier for movement of said carrier transverse said axis,
a worktable,
centrally located part spherical bearing means cooperating between said carrier and said worktable mounting said worktable for pivoting movements on said carrier and relative to said axis, said worktable having an extension thereon extending centrally below said part spherical bearing,
actuating means lying in a common plane perpendicular to said axis cooperating between said carrier and said worktable extension for pivoting movement of said worktable,
and drive means operatively connected to said support for rotation of said worktable about said axis including direct drive connections from said support to both said carrier and said worktable.

4. A device for supporting a workpiece for rotation about an axis of rotation and for positioning said workpiece at a desired relation relative to said axis of rotation comprising, a base,
a support,
bearing means cooperating between said support and said base mounting said support on said base for rotation about an axis of rotation,
a carrier,
bearing means cooperating between said support and said carrier mounting said carrier for movement on said support transverse said axis,
actuating means cooperating between said support and said carrier for movement of said carrier transverse said axis,
a worktable,
bearing means cooperating between said carrier and said worktable mounting said worktable for pivoting movements on said carrier and relative to said axis,
drive means operatively connected to said support for rotation of said worktable about said axis including direct drive connections from said support to both said carrier and said worktable,
actuating means cooperating between said carrier and said worktable for pivoting movement of said worktable, each of said actuating means including a pair of drive motors relatively spaced at ninety degrees about said axis of rotation, both pairs of said drive motors lying in a common plane perpendicular to said axis of rotation,
and force transmitting means cooperating between each respective motor and said worktable for applying positioning forces to said worktable substantially radially to said axis of rotation while allowing relative movement transverse the direction of force application.

5. A device for supporting a workpiece for rotation about an axis of rotation and for positioning said workpiece at a desired relation relative to said axis of rotation comprising, a base,
a worktable,
drive means operatively connected to said worktable for rotation thereof on said base and about an axis of rotation,
carrying means cooperating between said base and said worktable carrying said worktable for rotation on said base and for positioning of said worktable and a workpiece mounted thereon relative to said axis of rotation,
signal means responsive to the position of the workpiece with respect to said axis of rotation,
actuating means cooperating between said carrying means and said worktable for moving said worktable and a workpiece carried thereby relative to said axis of rotation to position said workpiece at a desired relation relative thereto, said actuating means including a pair of drive motors for each mode of adjustment relatively spaced at ninety degrees about said axis of rotation and lying in a common plane perpendicular thereto,
force transmitting means cooperating between each respective motor and said worktable for applying positioning forces to said worktable substantially radially to said axis of rotation while allowing relative movement transverse the direction of force application,
and control means responsive to said signal means and operatively connected to said actuating means for operation thereof in accordance with the workpiece position to position said workpiece at a desired relation relative to said axis of rotation.

6. A device for supporting a workpiece for rotation about an axis of rotation and for positioning said workpiece at a desired relation relative to said axis of rotation comprising, a base,
a worktable,
drive means operatively connected to said worktable for rotation thereof on said base and about an axis of rotation,
carrying means cooperating between said base and said worktable carrying said worktable for rotation on said base and for positioning of said worktable and a workpiece mounted thereon relative to said axis of rotation,
signal means on said base responsive to the position of the workpiece relative to said axis of rotation at one side of said axis, rotation responsive means responsive to positions of said worktable about said axis of rotation, actuating means cooperating between said carrying means and said worktable for moving said worktable and a workpiece carried thereby relative to said axis of rotation, said actuating means including a pair of drive motors for each mode of adjustment relatively spaced at ninety degrees about said axis of rotation and lying in a common plane perpendicular thereto, force transmitting means cooperating between each respective motor and said worktable for applying positioning forces to said worktable substantially radially to said axis of rotation while allowing relative movement transverse the direction of force application, and control means responsive to said signal means and said rotation responsive means operatively connected to said drive means for rotation of said worktable to bring portions of said workpiece at opposite sides of said axis sequentially into association with said signal means and to said actuating means for operation thereof in accordance with the relationship of the signals thus obtained to position said workpiece at a desired relation relative to said axis of rotation.

7. A device for supporting a workpiece for rotation about an axis of rotation and for positioning said workpiece at a desired relation relative to said axis of rotation comprising, a base, a worktable, drive means operatively connected to said worktable for rotation thereof on said base and about an axis of rotation, carrying means cooperating between said base and said worktable carrying said worktable for rotation on said base and for positioning of said worktable and a workpiece mounted thereon relative to said axis of rotation, gaging means on said base at one side of said axis providing a gaging signal determined by the position of the workpiece relative to said axis of rotation, rotation responsive means responsive to positions of said worktable about said axis of rotation, actuating means operatively connected to said worktable for movement of said worktable and a workpiece carried thereby relative to said axis of rotation, and control means responsive to said gaging means and said rotation responsive means operatively connected to said drive means for automatic sequential indexing of said worktable through an even number of equal angular increments and to equally spaced stationary gaging positions about said axis of rotation, said control means including storage and comparison means operatively connected to said actuating means for comparing active gaging signals obtained at each gaging position with stored signals obtained 180 degrees therefrom and operating said actuating means for corrective positioning of said worktable at each stationary gaging position in accordance with each pair of compared signals.

8. A device for supporting a workpiece for rotation about an axis of rotation and for positioning said workpiece at a desired relation relative to said axis of rotation comprising, a base, a worktable, drive means operatively connected to said worktable for rotation thereof on said base and about an axis of rotation, carrying means cooperating between said base and said worktable carrying said worktable for rotation on said base and for positioning of said worktable and a workpiece mounted thereon relative to said axis of rotation, signal means responsive to the position of said workpiece relative to said axis of rotation, actuating means cooperating between said carrying means and said worktable for movement of said worktable and a workpiece carried thereby relative to said axis of rotation to position said workpiece at a desired relation relative to said axis of rotation, said actuating means including a pair of drive motors for each mode of adjustment relatively spaced at ninety degrees about said axis of rotation and lying in a common plane perpendicular thereto, force transmitting means cooperating between each respective motor and said worktable for applying positioning forces to said worktable substantially radially to said axis of rotation while allowing relative movement transverse the direction of force application, means carrying said actuating means for simultaneous and equal rotation with said worktable whereby their basic operating relationship is maintained irrespective of the rotational positions thereof, rotation responsive means responsive to positions of said worktable about said axis of rotation, and control means responsive to said signal means and said rotation responsive means operatively connected to said actuating means for operation thereof in accordance with the workpiece position to automatically position said workpiece at a desired relation relative to said axis of rotation.

9. A device for supporting a workpiece for rotation about an axis of rotation and for positioning said workpiece at a desired relation relative to said axis of rotation comprising, a base, a worktable, drive means operatively connected to said worktable for rotation thereof on said base and about an axis of rotation, carrying means cooperating between said base and said worktable carrying said worktable for rotation on said base and for positioning of said worktable and a workpiece mounted thereon relative to said axis of rotation, signal means on said base responsive to the position of the workpiece relative to said axis of rotation at one side thereof, rotation responsive means responsive to positions of said worktable about said axis of rotation, actuating means cooperating between said carrying means and said worktable for movement of said worktable and a workpiece carried thereby relative to said axis of rotation to position said workpiece at a desired relation relative to said axis of rotation, said actuating means including a pair of drive motors for each mode of adjustment relatively spaced at ninety degrees about said axis of rotation and lying in a common plane perpendicular thereto, force transmitting means cooperating between each respective motor and said worktable for applying positioning forces to said worktable substantially radially to said axis of rotation while allowing relative movement transverse the direction of force application, means carrying said actuating means for simultaneous and equal rotation with said worktable whereby their basic operating relationship is maintained irrespective of the rotational positions thereof, and control means responsive to said signal means and said rotation responsive means operatively connected to said drive means for rotation of said worktable to bring portions of said workpiece at opposite sides of said axis sequentially into association with said signal means and to said actuating means for operation thereof in accordance with the relationship of the signals thus obtained to position said workpiece at a desired relation relative to said axis of rotation.

10. A device for supporting a workpiece for rotation about an axis of rotation and for positioning said workpiece at a desired relation relative to said axis of rotation comprising,
a base,
a support,
bearing means cooperating between said support and said base mounting said support on said base for rotation about an axis of rotation,
drive means operatively connected to said support for rotation thereof on said base and about said axis of rotation,
a worktable carried by said support,
supporting means cooperating between said support and said worktable carrying said worktable on said support for position of said worktable and a workpiece mounted thereon relative to said axis of rotation,
coupling means interconnecting said support and said worktable operative independently of said carrying means for equal and simultaneous rotation of said support and worktable together,
actuating means cooperating between said support and said worktable for positioning of said worktable and a workpiece carried thereby relative to said axis of rotation, said actuating means including a pair of drive motors for each mode of adjustment relatively spaced at ninety degress about said axis of rotation and lying in a common plane perpendicular thereto,
force transmitting means cooperating between each respective motor and said worktable for applying positioning forces to said worktable substantially radially to said axis of rotation while allowing relative movement transverse the direction of force application,
gaging means on said base at one side of said axis providing a gaging signal determined by the position of the workpiece relative to said axis of rotation,
position responsive means on said base relatively spaced about said axis,
operating means on said support at a predetermined positive relative to said actuating means cooperating with said position responsive means to signal predetermined reference rotational positions of said worktable on said base and relative to said gaging means,
and control means responsive to said gaging means and the signal provided thereby and responsive to said position responsive means operatively connected to said actuating means at said predetermined reference rotational positions for operation thereof in accordance with the workpiece position to automatically position said workpiece at a desired relation relative to said axis of rotation, said control means including means responsive to said position responsive means and operatively connected to said drive means for stopping said drive and locating each of said actuating means in a plane radial to said axis and including said gaging means during gaging and positioning of said worktable.

11. A device for supporting a workpiece for rotation about an axis of rotation and for positioning said workpiece at a desired relation relative to said axis of rotation comprising,
a base,
a support,
bearing means cooperating between said support and said base mounting said support on said base for rotation about said axis of rotation,
a worktable carried by said support,
supporting means cooperating between said support and said worktable carrying said worktable on said support for movement of said worktable and a workpiece mounted thereon with respect to said axis of rotation,
coupling means interconnecting said support and said worktable for simultaneous rotation thereof,
drive means operatively connected to said support and responsive to positions thereof for automatically sequentially indexing said support and worktable to each of four 90 degree angle positions about said axis of rotation and stopping rotation at each of said positions for a predetermined time delay,
gaging means on said base providing a gaging signal determined by the distance to the workpiece from a fixed reference at each 90 degree index position to determine the differential distance from said reference at opposite 90 degree index positions,
actuating means for adjusting said worktable on said support in mutually perpendicular directions respectively parallel to lines through each pair of opposed index positions,
and automatic control means for controlling said drive means and said actuating means responsive to the gaging signal to automatically perform a gaging operation at each ninety degree position and adjust the worktable on the support one-half of said differential distance during said time delay to cause the central axis of the workpiece to coincide with the axis of rotation.

12. A device for supporting a workpiece for rotation about an axis of rotation and for positioning said workpiece at a desired relation relative to said axis of rotation comprising,
a base,
a support,
bearing means cooperating between said support and said base mounting said support on said base for rotation about an axis of rotation fixed relative to said base,
a worktable carried by said support,
bearing means cooperating between said support and said worktable carrying said worktable on said support for movement of said worktable and a workpiece mounted thereon relative to said fixed axis,
drive means operatively connected to said support for sequentially indexing said support and worktable to each of four ninety degree angle operating positions about said fixed axis of rotation,
gaging means on said base at one side of said axis providing a gaging signal from a fixed reference as determined by the position of the workpiece relative to said axis of rotation at each ninety degree index position to determine the differential displacement from said fixed reference,
rotation responsive means responsive to positions of said support and said worktable about said axis of rotation,
first and second actuating means for adjusting said worktable on said support through actuating movement in mutually perpendicular directions respectively parallel to lines through each pair of opposed index positions,
and control means responsive to said gaging means and said rotation responsive means operatively connected to said drive means for indexing said support and worktable between said operating positions and at each position locating a respective one of said actuating means for actuating movement in a common plane substantially radial to said axis of rotation and including said gaging means during gaging and positioning of said worktable, said control means including storage and comparison means operatively connected to said actuating means for comparing active gaging signals obtained at each operating position with stored signals obtained one hundred eighty degrees therefrom and operating said actuating means for corrective positioning of said worktable in accordance with each pair of compared signals.

13. A device for supporting a workpiece for rotation about a fixed axis of rotation and for positioning said workpiece to position a central axis of the workpiece to coincide with said fixed axis of rotation comprising,
a base,
a support,
bearing means cooperating between said support and said base mounting said support on said base for rotation about said axis of rotation fixed with respect to said base,
drive means operatively connected to said support for rotation thereof on said base and about said fixed axis of rotation,
a worktable carried by said support,
supporting means cooperating between said support and said worktable carrying said worktable on said support for adjustment of said worktable and a workpiece mounted thereon transverse said axis and for pivoting movement relative thereto,
coupling means interconnecting said support and said worktable for simultaneous rotation thereof,
gaging means providing a gaging signal responsive to the position of the workpiece with respect to said axis of rotation,
first actuating means carried by said support and operatively connected to said worktable for adjusting the worktable and a workpiece carried thereby in a plurality of angularly related directions relative to said support and transverse said axis of rotation,
second actuating means carried by said support and operatively connected to said worktable for inclining said worktable and a workpiece carried thereby relative to said support and said axis of rotation,
and automatic control means responsive to said gaging means and operatively connected for control of said drive and actuating means for automatically and sequentially indexing said support to predetermine positions, performing a gaging operation and adjusting said worktable on said support at each such indexed positions to position the central axis of the workpiece to coincide with said fixed axis of rotation.

14. A device for supporting a workpiece for rotation about an axis of rotation and for positioning said workpiece at a desired relation relative to said axis of rotation comprising,
a base,
a support,
bearing means cooperating between said support and said base mounting said support on said base for roation about an axis of rotation,
drive means operatively connected to said support for rotation thereof on said base and about said axis of rotation,
a worktable carried by said support,
supporting means cooperating between said support and said worktable carrying said worktable on said support for movement of said worktable and a workpiece mounted thereon transverse said axis and for pivoting movement relative thereto,
coupling means interconnecting said support and said worktable for simultaneous rotation thereof,
gaging means on said base at one side of said axis of rotation providing a gaging signal determined by the position of the workpiece relative to said axis of rotation,
rotation responsive means responsive to positions of said worktable about said axis of rotation,
actuating means cooperating between said support and said worktable for pivoting and transverse movement of said worktable and a workpiece carried thereby relative to said axis of rotation,
and control means responsive to said gaging means and said rotation responsive means operatively connected to said drive means for automatic sequential indexing of said worktable through an even number of equal angular increments and to equally spaced gaging positions about said axis of rotation, said control means including storage and comparison means operatively connected to said actuating means for comparing active gaging signals obtained at each gaging position with stored signals obtained one hundred eighty degrees therefrom and operating said actuating means at each index position for corrective positioning of said worktable in accordance with each pair of compared signals.

References Cited by the Examiner
UNITED STATES PATENTS

| | | | |
|---|---|---|---|
| 1,488,564 | 4/1924 | Steinle | 33—174 X |
| 3,063,155 | 11/1962 | Prefontaine | 33—174 |
| 3,125,811 | 3/1964 | Pierce et al. | 33—174 |
| 3,164,909 | 1/1965 | Rosenberg | 33—174 |

LEONARD FORMAN, *Primary Examiner.*

SAMUEL S. MATTHEWS, *Examiner.*